Aug. 15, 1939.          J. SHEBOL          2,169,539
ELECTRIC MOTOR
Filed Feb. 20, 1937          3 Sheets-Sheet 1

INVENTOR
Joseph Shebol
BY Robert Cobb
ATTORNEYS

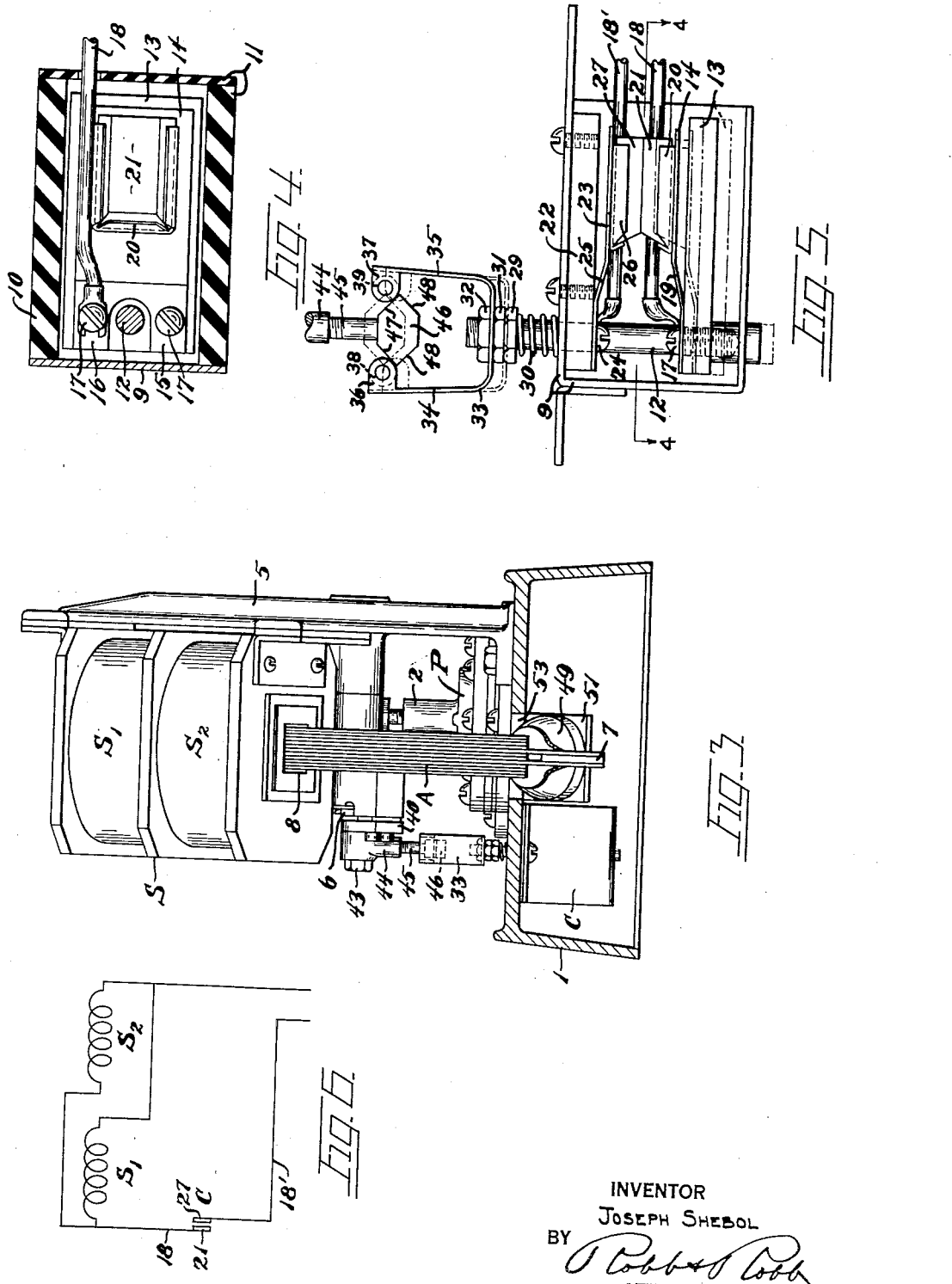

Aug. 15, 1939.  J. SHEBOL  2,169,539
ELECTRIC MOTOR
Filed Feb. 20, 1937  3 Sheets-Sheet 3

INVENTOR
JOSEPH SHEBOL
BY
ATTORNEYS

Patented Aug. 15, 1939

2,169,539

UNITED STATES PATENT OFFICE 2,169,539

ELECTRIC MOTOR

Joseph Shebol, Syracuse, N. Y.

Application February 20, 1937, Serial No. 126,923

4 Claims. (Cl. 172—126)

This invention appertains to electric motors, and more particularly, to electro-magnetic motors embodying one or more solenoids adapted to act upon an armature, or armatures, arranged for oscillating movement about a fixed axis. The motor is characterized primarily in the provision of an armature disposed in radially spaced relation to the axis of its pivotal or oscillating movement, and the armature is arranged so as to move into and out of its coacting solenoid responsive to the establishment by the solenoid of a magnetic field in the zone of the armature.

The invention is principally applicable to uses where the power demand is relatively low, as for example, on the order of ¼ H. P. or less, but it is to be understood that its use is not necessarily so limited inasmuch as the motor might be constructed so as to afford higher output capacities. Among the various fields of practical application of the invention, may be enumerated such uses as drives for small trip hammers, jig saws, filing machines, pumps (both hydraulic as well as pneumatic), and many others which will suggest themselves as an understanding of the invention is more fully attained from the following description, and it might be said that the invention may be adapted to almost any condition where an oscillating or reciprocating drive is desired.

One of the primary objects of the invention is to provide a simple, inexpensive, rugged and economical motor for those uses where the more complicated and expensive rotary motors might be dispensed with if a more economical and simple drive could be had, and in this connection, the present invention fills a long felt want.

Another object of the invention is to provide an electro-magnetic motor of the oscillating armature type wherein the power output remains substantially constant irrespective of the relative motion of the armature and solenoid, which, as far as I am aware, is a feature which has heretofore never been proposed.

Still another object of the invention is the provision of means for imparting kinetic energy to the motor armature in such manner as to materially improve the efficiency of the motor beyond what it would normally be in a case where the armature derives its power entirely from the magnetic field of the electro-magnetic means. I have found that through the aid of this additional kinetic energy, the over-all efficiency of the motor is raised to a marked degree over and above the theoretical as well as practical efficiency of an ordinary small rotary electrical motor, and this feature further enhances the practicability of the invention in its substitution for the usual and other well known types of motors or driving instrumentalities.

A still further object of the invention is the provision of a novel and improved circuit making and breaking device, by means of which the magnetic field adapted to be established by the solenoid which forms a part of my new motor, may be made and interrupted in timed relation to the motion of the armature, which is to say, the stroke of the motor, this device being preferably so constructed as to insure positive action of the circuit making and breaking device and consequent positive and uniform action of the motor.

Other and further objects and advantages of the invention will be hereinafter described, and the novel features thereof defined by the appended claims.

In the drawings:

Figure 3 is a sectional view taken approximately on the line 3—3 of Figure 2;

Figure 4 is a horizontal sectional view taken through the circuit making and breaking device substantially at the plane of the contact faces of the contacts thereof as generally indicated by the line 4—4 of Figure 5;

Figure 5 is an enlarged detail view in side elevation of the circuit making and breaking device or unit, with one side and end wall of its housing removed, such walls being preferably formed of insulating material, as shown in Figure 4, and the view showing in broken lines the limits of relative motion of the parts as in making and breaking the electrical circuit;

Figure 6 is a diagrammatic view of the electrical circuit of the motor of Figures 1 to 5, inclusive;

Referring first to the single-acting type of motor illustrated in Figures 1 to 6, inclusive, 1 generally designates a base constituting a support, and in part, a housing, for the various parts of the motor and the pump adapted to be driven thereby. The pump is generally designated P, which is of the pneumatic, diaphragm type, and includes a vertically reciprocable stem 2 and an outlet 3 to which may be connected a flexible or other conduit 4 for conveying air under pressure to the desired point of use or storage. It will be understood that the details of this pump P form no part of my invention, and the pump has been shown merely by way of illustration of one practical application of use of the motor which is the subject matter of this application.

The motor generally comprises an oscillatable armature A, a solenoid S and a circuit making and breaking device or unit C, which are so interrelated as to cause the armature A to be set into oscillating motion so that power may be delivered to the pump P or other apparatus to be driven by the motor.

Figure 2:
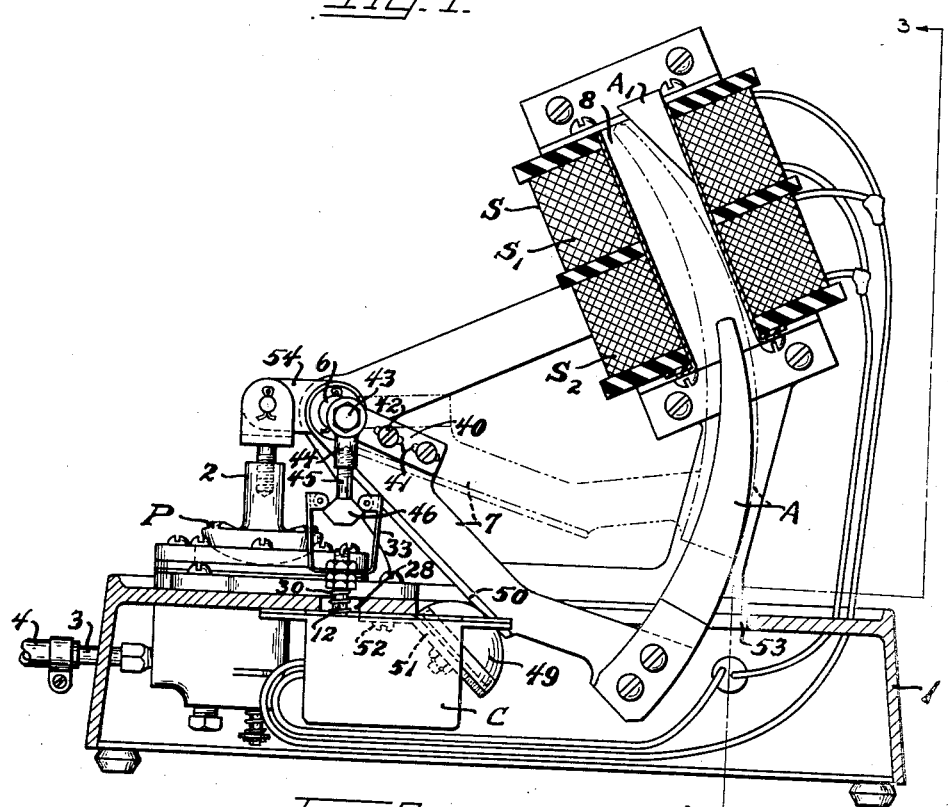
Figure 2 is a view, partly in side elevation and partly in section, of the apparatus shown in Figure 1.

Upon the base 1 is mounted a frame generally designated 5, from which laterally extends horizontally above the base 1 an axle or shaft 6 upon which the armature A is swingably or oscillatably mounted, the shaft 6 constituting a fixed axis for the motor. As will be best seen in Figure 2, the armature A is radially spaced from the axis 6, and is mounted upon the outer end of a radial arm 7, the inner end of which is journaled upon the shaft 6. The armature A is preferably laminated to minimize heat loss in the motor and to otherwise improve its efficiency, and as seen in Figure 2, the armature is elongated and preferably curved on an arc having the arm 7 as its approximate radius. Moreover, the armature A is tapered in an upward direction, the reason for which will hereinafter more fully appear.

The solenoid S is fixedly mounted on the frame 5 with its central air core disposed so as to be capable of receiving the armature A therein, as shown in broken lines in Figure 2, when the solenoid is energized. The solenoid is preferably composed of a plurality of separate windings connected in parallel, two such windings $S_1$ and $S_2$ being shown and being sufficient for practical purposes. These windings $S_1$ and $S_2$ are coaxial, with one winding superposed above the other, and the purpose of this arrangement is to establish a plurality of points at which the pull of the magnetic field on the armature A will be substantially equal, instead of having a single coil with a single point of maximum magnetic field strength. It will be understood that the maximum pull of a solenoid is at about midway between the opposite ends of the solenoid, so by making the windings $S_1$ and $S_2$ of the same approximate size and number of turns of wire, and connecting these windings in parallel, there will be two points where the magnetic field will be approximately equal, each of said points being approximately midway between the upper and lower ends of the respective coils $S_1$ and $S_2$, thus tending to establish a more or less constant pull on the armature A as the armature moves to the broken line position within the core 8, as shown in Figure 2. The tendency towards the establishment of a constant pull on the armature A by the double wound solenoid S is further augmented by the tapered construction of the armature A, and by the further provision of a fixed, laminated armature segment $A_1$ mounted in the upper end of the core 8. This segment $A_1$ tapers downwardly so that it may be said to have a generally wedge-like shape, so that when the pivotal armature A reaches the upper limit of its oscillating movement, the amount of iron in the core 8 of the solenoid S will be substantially the same throughout the whole length of the core. On the other hand, when the armature A is in its lowermost position illustrated in full lines in Figure 2, only the upper extremity of the armature A is disposed within the lower end of the core 8, and the amount of iron in the lower end of the core 8 will be approximately equal to the amount in the upper end, which latter is established by the fixed armature segment $A_1$.

As previously mentioned, the solenoid windings $S_1$ and $S_2$ are connected in parallel, as best seen in the circuit diagram shown in Figure 6, and in one side of the circuit which includes these windings is a circuit making and breaking device or switch, generally designated C, the purpose of which is to cause the windings $S_1$ and $S_2$ to be energized and deenergized in proper timed relation to the motion of the oscillatable armature A. This circuit making and breaking device may be of any suitable type, as will be obvious to those skilled in the art, but I have found that the construction more particularly illustrated in Figures 4 and 5 is better suited for my purposes than anything of which I am aware, although it is to be understood that I do not wish to be limited to this precise construction.

As shown, the circuit making and breaking device or switch C comprises generally a frame 9, which may be formed of sheet metal, forming the top, bottom and one end, of a housing. One side of the frame 9 is closed by an insulating wall 10, and the other side and end of the frame is preferably closed by a combination side wall and end 11 also formed of insulating material, and preferably removably mounted on the frame so as to afford access to the switch parts when occasion may require. The combination frame and housing may be modified as desired, and it is adapted to be mounted upon, and preferably within the base 1, as best seen in Figure 2. Extending vertically through the frame or switch housing is a reciprocable stem 12, and adjacent to the lower end thereof, a block of insulating material 13, such as "Bakelite" is fixedly mounted thereon so as to be movable upwardly and downwardly with the stem 12. This block 13 has mounted thereon a resilient plate 14 of electrically conductive material, such as copper or bronze, this plate being bifurcated at one end to provide arms 15 and 16 straddling the stem 12 in spaced relation thereto. The arms 15 and 16 are secured to the block 13 in any suitable manner, as by means of screws 17, one of which also serves as a terminal for one of the conductors 18 forming a part of the electrical circuit shown in Figure 6. Near the bifurcated end of the plate 14, as at 19, the plate is upwardly offset so as to lie in upwardly spaced relation to the block 13, whereby to permit yieldable movement of the plate 14 towards and away from its support 13. On the upper side of the plate 14, there is provided a metal clamping member 20 which is adapted to receive and secure a contact member 21 therein, such contact member being preferably of the carbon block type affording a substantial contact area over its upper face. The carbon block 21 may be removed for replacement by another new block, when occasion requires, by sliding the same endwise from the clamping member 20, but when positioned within the clamping member 20, the block 21 is yieldably but firmly clamped in fixed position therein by the marginal flanges thereof, as will be obvious from reference to Figures 4 and 5.

Figure 1:
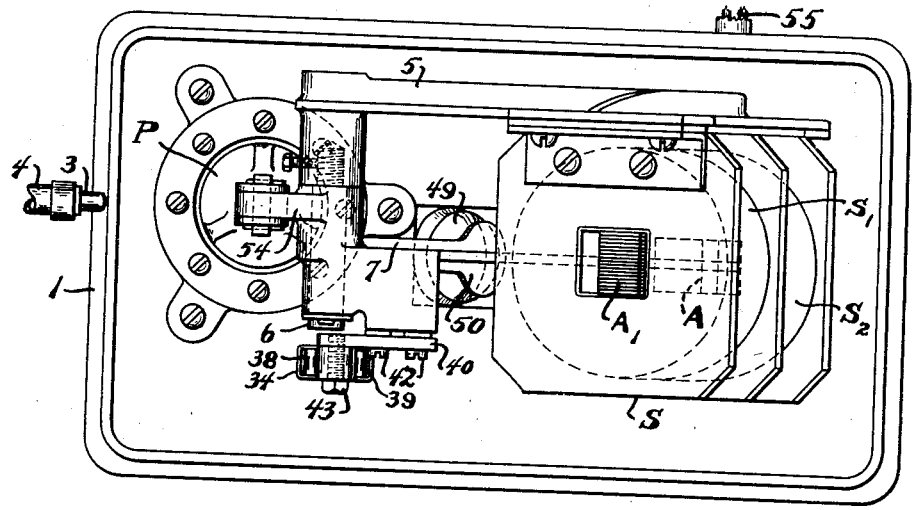
Figure 1 is a top plan view of a single-acting type of motor constructed in accordance with the invention, and illustrating its application by way of example, as a drive for a more or less well known type of pump, which, as shown, may be characterized as a pneumatic pump.

Fixedly secured to the underside of the top of the frame 9 is another plate or block 22 of insulating material, and to the lower side of this member 22 is secured another conductive plate 23 which is generally similar to the plate 14. This plate 23 is similarly bifurcated so as to straddle the stem 12 whereby to maintain the same in spaced relation to the stem, screws 24 serving to fix the plate 23 to the block 22. One of these screws 24 may be utilized as a terminal for a circuit conductor 18' which leads from the switch C to one side of the line, as seen in Figure 6. Plate 23 is downwardly offset, as at 25, in a manner and for the same purpose as plate 14, and on the lower side of the plate 23, there is provided a conductive clamping member 26, similar to the clamping member 20, which serves to mount another carbon block contact member 27, the lower contact face of which is adapted to register with and be positively engaged by the upper contact face of the contact block 21, responsive to reciprocal movement of the stem 12. It will be obvious that when the stem 12 is raised, the lower contact block 21 will be brought into contact with the upper block 27, and by reason of the resilient mounting of these blocks afforded by plates 14 and 23, their engagement will be cushioned, thereby minimizing the noise which would otherwise be present if these parts were completely rigid and unyielding. Moreover, the yieldable mounting of the blocks 21 and 27 affords more perfect contact of the contact faces thereof by reason of the slight wiping action of one face across the other as the contact is established. Good contact is further insured by the provision of contact faces of substantial area on each of the blocks 21 and 27. The stem 12 of the switch C is operatively connected with the armature A so as to be actuated in timed relation thereto, and this operative connection will now be more particularly described. The stem 12 is extended upwardly through the top of the frame or housing 9, and extends upwardly through an opening 28 formed in the motor base 1, as best seen in Figure 1. The upper extremity of the stem 12 is threaded and carries a nut 29 which forms a seat for one end of a coil spring 30 which encircles the upper end of the stem, the opposite end of the spring 30 seating against the top of the frame or housing 9. This spring normally urges the stem 12 in an upward direction to bring the contact blocks 21 and 27 into firm contacting engagement as shown in full lines in Figure 5. The relative contact pressure between these contact members 21 and 27 may be adjusted by adjusting the nut 29 upwardly or downwardly on the threaded end of the stem 12. A lock nut 31 serves to positively maintain the nut 29 in adjusted position.

Also mounted on the upper extremity of the stem 12 and clamped between the lock nut 31 and a nut 32, is a member 33 formed of resilient material and having a generally U-shaped configuration, this member including upwardly extending arms 34 and 35 disposed in spaced relation to each other. These arms, being resilient, are movable towards and away from each other, and at the upper end of each arm is provided a pair of ears or lugs 36 and 37, between each pair of which are mounted the rollers 38 and 39, the rollers being journaled in the ears.

Adjustably mounted upon the arm 7 of the armature A, is a bracket 40 having elongated slots 41, through which extend the screws 42 which serve to secure the bracket 40 to the arm. The slots 41, of course, permit radial adjustment of the bracket relatively to the arm 7, or in other words, relatively to the axis 6 of the armature A. At the end of the bracket 40 nearest to the axis 6 of the armature A, there is provided a stud 43, and upon this stud 43 is journaled a member 44 which extends downwardly towards the switch C, and the lower end of which is threaded to receive a stem 45. On the lower extremity of the stem 45, there is provided a head 46, the opposite sides of which are inclined outwardly and downwardly, as at 47, and further inclined downwardly and inwardly at substantially right angles to 47, as at 48. These inclined faces 47 and 48 constitute cam surfaces and are adapted to coact with the rollers 38 and 39, previously described, to actuate the circuit making and breaking device C, by reason of the eccentric relation of the stud 43 to the axis 6 of the armature A. Obviously, the adjustment of the bracket 40 permits adjustment of the throw of the eccentric stud 43, and the threaded interconnection of the stem 45 with the member 44 permits adjustment of the point at which the reciprocal motion of the switch stem 12 is reversed.

The actuation of the switch stem 12, and consequently the contacts, is in the nature of a snap or instantaneous action resulting from the provision of the cam surfaces 47 and 48 on the head 46 of the switch actuator instrumentalities. As seen in Figures 2 and 4, the head 46 is interposed between the resilient arms 34 and 35 of the member 33 which is fixed to the upper end of the switch stem 12, and when the armature A is in a position at the bottom of its downward stroke, the rollers 38 and 39 are in engagement with the inclined surfaces 47 of the head 46, which tend to positively urge the stem 12 upwardly, with the switch contact blocks 21 and 27 in firm contacting engagement. This upward pull on the stem 12 produced by the interaction of the inclined cam surfaces 47 and the rollers 38 and 39, supplements the upward urge of the stem 12 by the coil spring 30, although the spring 30 may be omitted entirely if desired and the member 33 relied upon to yieldably urge the contacts towards and away from each other as the rollers 38 and 39 pass over the dead center of the cam surfaces 47 and 48. The switch contacts being closed when the parts are in their full line positions illustrated in Figures 2 and 4, the solenoid S becomes energized and creates a magnetic field which acts upon the armature A to pull the armature upwardly with a uniform or substantially constant pull, until the armature A reaches the upper limit of its movement as illustrated in broken lines in Figure 2. As the armature A approaches the upper limit of its movement, the actuator head 46, which moves upwardly responsive to the upward movement of the armature A, also approaches the upper limit of its movement, as illustrated in broken lines in Figure 4, and during this upward movement of the actuator head 46, the resilient arms 34 and 35 will spring outwardly away from each other, allowing the rollers 38 and 39 to roll from the upper inclined cam surfaces 47 onto the lower inclined cam surfaces 48. This rolling action of the rollers from the cam surfaces 47 to the cam surfaces 48 is accomplished with great rapidity, so that it is characterized as an instantaneous operation and might be termed a "snap action". As soon as the rollers pass onto the lower cam surfaces 48, the inward pressure of the spring arms 34 and 35 reacting against the cam surfaces 48 forces the switch stem 12 downwardly and consequently opens the switch contacts 21 and 27, it being understood that the pressure of the arms 34 and 35 is sufficient to overcome the force of the spring 30. As soon as the switch contacts open, the solenoid S is deenergized and its pull upon the armature A is discontinued, whereupon the armature A may drop by gravity to its lower position shown in full lines in Figure 2. As the armature approaches its lower position, and preferably before it reaches the limit of its downward movment, the rollers 38 and 39 suddenly ride from the lower inclined cam surfaces 48 of the actuator head 46 onto the upper inclined cam surfaces 47, thereby forcing the switch stem 12 upwardly, aided by the force of the spring 30, and causing the switch contacts to close and again energize the solenoid S, as a result of which the cycle above described is repeated. It will be understood that in both the open as well as the closed condition of the switch contacts 21 and 27, the position of the shiftable contact 21 which is carried by the switch stem 12 is positively maintained by the reaction of the pressure of the resilient arms 34 and 35 against the cam surfaces of the actuator head 46, through the intermediary of the rollers 38 and 39. The construction just described thus assures uniformity, rapidity and positiveness of action of the circuit making and breaking instrumentalities.

While so much of the motor construction as has just been described constitutes the essential elements of the motor, and the motor would be fully operative, considerable efficiency would be sacrificed in relying solely upon the solenoid S to overcome the inertia of the armature A, especially at the beginning of the upward movement of the armature. I have found that by providing a resilient buffer member 49, as best seen in Figures 2 and 3, against which the radial arm 7 which carries the armature A may have impact at the end of the downward stroke of the armature, the efficiency of the motor is materially increased. This buffer member 49 is preferably composed of rubber, although it is to be understood that I do not wish to be limited to this material. Most any resilient material will serve the purpose, and even a metallic spring might be substituted for the rubber buffer. However, the rubber buffer is relatively inexpensive and has been found to be eminently suited for this use. As shown, the buffer 49 is partly spherical in shape, and the radial arm 7 is laterally extended at its lower edge to provide a web-like abutment flange 50 which is adapted to take the impact against the buffer 49. The buffer may be mounted in any convenient position, preferably within the base 1, as by means of a bracket 51 which is secured to the underside of the base by means of a screw 52. The base is slotted, as at 53, to permit the arm 7 and the armature A to swing downwardly sufficiently far to allow the abutment flange 50 to engage the buffer 49, as best seen in Figure 2.

To connect the motor with the pump P so that the latter will be driven by the motor, a lever 54 is provided as a part of the radial arm 7, and preferably extends towards the side of the axis 6 opposite to the arm 7, as seen in Figure 2, and this lever 54 is pivotally interconnected with the stem 2 of the pump P. It is to be understood, however, that the interconnection of the motor with the pump P may be carried out in numerous other ways, and may or may not include a lever system for multiplying the leverage ratio of the motor, according to the particular use to which the motor is to be put.

In the case illustrated in Figures 1 to 6, by way of example, the resistance of the pump P acts in conjunction with the buffer 49 to impart kinetic energy to the armature A in reversing the motion of the armature as it reaches its lowermost position. In face, I have found that as the pressure of the pump P increases, the rate of oscillation of the armature A increases. This is a very desirable feature in certain applications to which my invention may be applied. However, where the load on the motor remains constant, the armature A will oscillate at a substantially constant rate, and the solenoid circuit will be automatically controlled in response to the movement of the armature, the control being preferably such that the solenoid S is energized from a time just prior to the armature reaching its lowermost position, until approximately the end of the upward movement of the armature. It follows then that when the armature is in a state of rest, the switch C will be closed so that as soon as the motor terminals 55 are connected across the line, the motor will automatically start, and its action will be continuous until the motor is disconnected from the line in a manner other than by the intermittent and temporary disconnection resulting from the actuation of the switch unit C.

Figure 7:
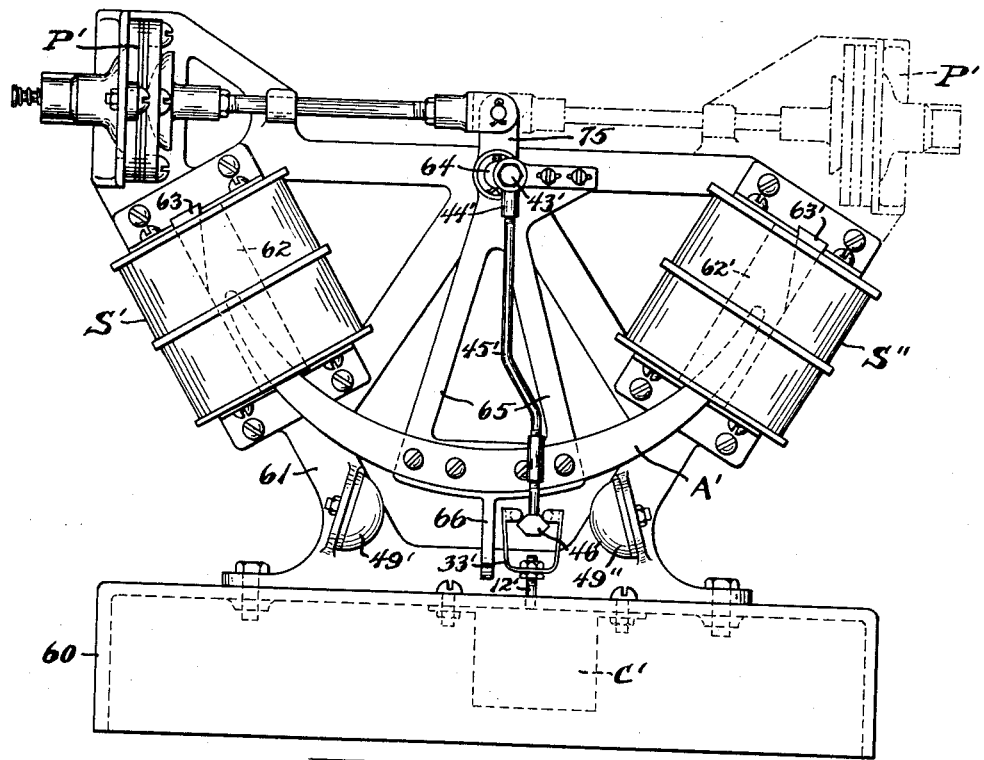
Figure 7 is a view in side elevation of a double-acting type of motor constructed in accordance with my invention, and further illustrating its application to the driving of a well known type of pump which may be of the hydraulic type, one such pump being shown in full lines, and a second optional pump being shown in broken lines.
Figure 8:
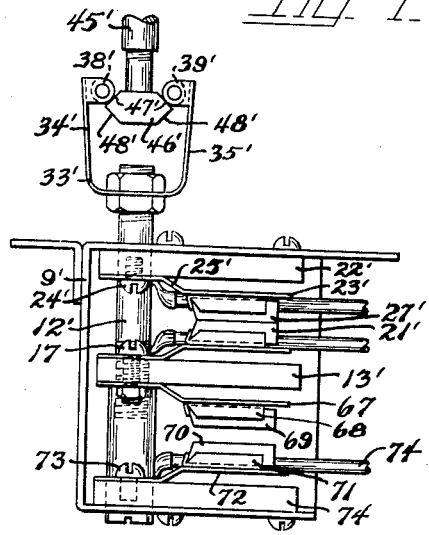
Figure 8 is an enlarged view in side elevation of a circuit making and breaking device or unit, generally similar to Figure 5, and modified so as to be more particularly applicable to the double-acting motor of Figure 7.
Figure 9:
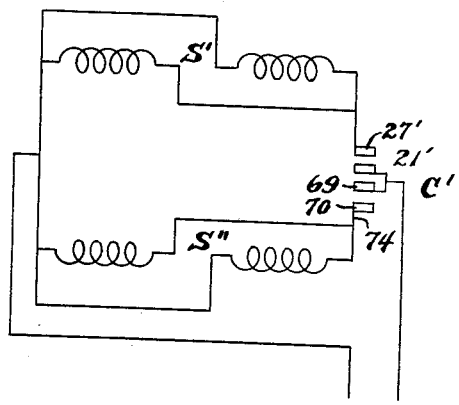
Figure 9 is a diagrammatic view of the electrical circuit of the motor of Figure 7.

Referring now to the double acting type of motor illustrated in Figures 7 to 9, inclusive, 60 designates the base and 61 a frame mounted thereon and extending upwardly therefrom. Fixedly mounted upon the frame 61 is a pair of solenoids S' and S", each of which is made up of at least two separate windings connected in parallel, as in the case of the single acting type of motor previously described. Also, each of the solenoids S' and S" is provided with a central air core 62 and 62', in the upper end of which is fixed a laminated iron core segment 63 and 63', corresponding to the fixed armature segment A₁. Extending laterally from the frame 61 is a fixed axle or shaft 64, upon which is journaled an arm 65 for oscillating movement on the shaft 64 as an axis. The free end of the arm 65 has mounted thereon an elongated, arcuate, tapered, laminated armature A', which, in this instance, is extended at opposite sides of its supporting arm 65 for coaction with the respective solenoids S' and S". Extending from the arm 65 at any convenient point, as for example, at the lower end thereof, is an abutment 66, the opposite sides of which are ultimately adapted to have abutting engagement with the pair of opposed resilient buffer members 49' and 49", each of which is fixedly mounted upon the frame 61 and corresponds to the buffer 49 of the single acting type of motor. The rebound imparted to the armature A', pursuant to impact of the abutment member 66 against one of the buffer members 49' or 49", is utilized to overcome the inertia of the armature A' and impart kinetic energy thereto, aiding the pull of the magnetic field created by the solenoid which is acting to urge the armature A' in the direction of the rebound. This action is substantially the same as has been previously described, excepting that the various parts have been duplicated at opposite sides of the axis of oscillation of the armature A', whereby to create a double acting type of motor.

To energize and deenergize the solenoids S' and S'' in proper timed relation to the oscillating motion of the armature A', a circuit making and breaking device or switch C' is provided, this switch being much the same as the switch C of the single acting type of motor, excepting that in the case of the double acting type of motor employing two solenoid units S' and S'', an additional pair of contact members is required to control the additional solenoid circuit. This modified making and breaking device is best seen in Figure 8, wherein 9' designates the frame or housing, and 12' the switch stem which is reciprocably mounted therein for movement in an upward and downward direction responsive to oscillating movement of the armature A'. The upper end of the stem 12' is operatively connected with the armature A', or more particularly, with the arm 65, in a manner quite similar to the construction illustrated in Figures 2 and 4, and the same or equivalent parts in Figure 8 have been identified by the same reference characters raised to the first power, thereby eliminating the necessity for repeating the detailed description of these parts previously given. It is important to note, however, that the snap or instantaneous action of the circuit making and breaking device, resulting from the peculiar construction and relation of the actuator head 46' and the resilient roller carrying arms 34' and 35', is utilized in the switch C' of the double acting type of motor as well as in the single acting type, and forms an important feature thereof for the same reasons hereinbefore mentioned. The upper pair of switch contacts, as shown in Figure 8, and their associated parts, are identical with those parts illustrated in Figure 5, and have been identified by the same reference characters raised to the first power. In modifying the switch to adapt it to the double acting motor circuit, the movable block 13' has mounted on the lower side thereof a resilient plate 67 which is downwardly offset to permit yieldable movement of the plate towards and away from the block 13'. Upon this plate 67 is mounted a clamping member 68 which supports the carbon block conductor member 69, the lower face of which is adapted to be engaged with the upper face of another carbon block contact member 70 mounted in a clamping member 71 carried by an upwardly offset resilient plate 72, the latter in turn being fixedly secured, as by screws 73, to a block of insulating material 74 secured to the bottom of the frame or housing 9'. One of the screws 73 serves as a terminal for the circuit conductor 14 which forms a part of the electrical circuit diagrammatically illustrated in Figure 9.

Now when the stem 12' of switch C' is forced upwardly, the upper pair of contact members 27' and 21' are closed, and the lower pair of contact members 69 and 70 are opened, thereby energizing only one of the solenoid units, as for example, S'. The energization of this solenoid causes the armature A' to be pulled in a clockwise direction, as viewed in Figure 7, into the open solenoid core 62, and as the armature approaches the limit of its oscillating motion in this direction, the rollers 38' and 39' pass from the upper inclined cam surfaces 47' of the actuator head 46' to the lower cam surfaces 48', causing the switch stem 12' to move downwardly with a snap-like action, which results in opening the upper contact members 21' and 27' and closing the lower pair of contact members 69 and 70, thereby deenergizing the solenoid unit S', and energizing the other solenoid unit S''. At about the same time as this action of the switch occurs, the abutment member 66 impacts against the buffer member 49', and the armature A' rebounds in a counter-clockwise direction, as viewed in Figure 7, this rebounding motion being a material aid to the pull of gravity on the armature and the force of the magnetic field created by solenoid S'' which pulls the armature A' in this counter-clockwise direction and into the open core 62' of the solenoid S''. As the armature A' approaches the limit of its oscillating motion in the counter-clockwise direction, the actuator head 46' is forced downwardly between the rollers 38' and 39', until ultimately the rollers pass quickly from the lower inclined cam surfaces 48' to the upper inclined cam surfaces 47' of the actuator head 46', causing the switch stem 12' to move upwardly with a quick snap-like motion, thereby opening the lower pair of contact members 69 and 70, and again closing the upper pair of contact members 21' and 27', reenergizing the solenoid S'. Thereupon, the cycle is repeated. It will be understood that at about the time the armature A' reaches the limit of its motion in the counter-clockwise direction, the abutment member 66 impacts against the buffer member 49'', and a rebound is imparted to the armature A' in a clockwise direction, aiding the pull of gravity and the magnetic field created by the solenoid S', to swing the armature clockwise.

In the double acting type of motor, at least one of the solenoids S or S'' is always energized, excepting for a momentary interval when the switch C' is being actuated to open one pair of contacts and close the other. Preferably, this switch change or actuation takes place at some point to one side or the other of the lower dead center position of the armature A', so that if the motor is stopped and the armature assumes a lower dead center position as illustrated in Figure 7, the motor will automatically start as soon as its terminals are connected across the line.

As shown in Figure 7, the armature supporting arm 65 is extended upwardly on the opposite side of the pivotal axis 64 to provide a lever 75, and this lever may be utilized as a crank arm, the same as the lever 54 in Figure 2, to drive any suitable apparatus to which the motor may be applied, such as, for example, the pump P' in Figure 7. P' is intended to represent in Figure 7 a diaphragm type of hydraulic pump, but it is to be understood that I do not wish to be limited to any particular type of pump, or for that matter, any particular type of load to which the motor may be subjected. When using such a pump as P', the pump may be conveniently supported by the motor frame 61, and if desired, more than one pump might be connected to the crank arm 75 as illustrated by the broken lines in Figure 7. On the other hand, the crank arm 75 may be connected to some other type of mechanism to which it is desired to impart oscillatory or reciprocatory motion.

In either the single or double acting types of motor, the capacity of the same might be materially increased by the simple expedient of utilizing a double or bifurcated armature A or A', in which case, another set of solenoids would be provided to coact with the additional armature parts and these solenoids connected in parallel with the solenoids illustrated herein for simultaneous energization and deenergization under the control of the circuit making and breaking device C or C'. That is to say, as viewed in side elevation in Figures 2 and 7, the armatures and solenoid units would be duplicated and arranged corresponding to those appearing in these figures, but behind these parts which have been illustrated.

The operation of the motor should be readily apparent from the foregoing description, taken in conjunction with the figures of the drawings, and no further explanation thereof is necessary.

While the specific details have been herein shown and described, the invention is not confined thereto, as changes and alterations may be made without departing from the spirit thereof as defined by the appended claims.

Having thus described my invention, what I claim as new and desire to secure by Letters Patent is:

1. An electric motor of the class described, comprising an armature bodily oscillatable about a fixed center, electro-magnetic means adapted to establish a magnetic field acting to swing the armature about its center, means for periodically energizing and deenergizing said electro-magnetic means whereby to create a sustained oscillation of said armature, and means for imparting the kinetic energy of said armature to augment the pull of the electro-magnetic means during oscillation of the armature, said last named means comprising resilient buffer means cooperatively arranged to impart rebound motion to said armature.

2. An electric motor of the class described, comprising a frame, an arm oscillatably mounted upon said frame, an elongated armature fixed to said arm intermediate the ends of the armature and extending at opposite sides of said arm on an arc, the radius of which is substantially equal to the length of said arm, a pair of solenoids mounted upon said frame and having their air cores disposed to alternately receive the respective opposite ends of the armature, and instantaneously operating means for intermittently energizing said solenoids in alternate and timed relation to the movement of the armature, and for sustaining each energization through the normal position of rest and until the armature approaches the end of each stroke, whereby to create sustained self-starting oscillation of said armature.

3. An electric motor of the class described, comprising an armature bodily oscillatable about a fixed center, electro-magnetic means adapted to establish a magnetic field acting to swing the armature in at least one direction about its center of oscillation, and means for intermittently energizing and deenergizing said electro-magnetic means, said last mentioned means comprising a switch unit having a fixed contact member, a movable contact member, a reciprocably mounted stem upon which said movable contact member is carried, a pair of resilient arms secured to one end of said stem, and each of said arms having mounted at its upper end a roller, and actuating means for reciprocating said stem, said actuating means including a member mounted upon the armature arm in eccentric relation to the axis of oscillation of said armature, and having an actuator head interposed between and movable relatively to the resilient arms on the upper ends of said switch stem, said actuator head being provided with oppositely inclined cam surfaces coacting with the rollers aforesaid for yieldably imparting reciprocal motion to the switch stem with a snap-like action responsive to oscillation of the armature.

4. An electric motor of the class described, comprising an armature bodily oscillatable about a fixed center, electro-magnetc means adapted to establish a magnetic field acting to swing the armature about its center, said electro-magnetic means including a circuit and a circuit controller adapted to periodically make and break said circuit, and quickly-operable means responsibe to movement of the motor armature for actuating the circuit controller in timed relation thereto, said last named means comprising cam and roller means arranged to have relative movement in such manner as to actuate the circuit controller with a snap action.

JOSEPH SHEBOL.